US009266048B2

(12) United States Patent
Kaddour

(10) Patent No.: US 9,266,048 B2
(45) Date of Patent: Feb. 23, 2016

(54) MICROBICIDAL FILTER AND FILTRATION CARTRIDGE INCORPORATING SUCH A FILTER

(75) Inventor: Stephane Kaddour, Landerneau (FR)

(73) Assignee: L'INDUSTRIELLE DU PONANT, Plouedern (FR)

( * ) Notice: Subject to any disclaimer, the term of this patent is extended or adjusted under 35 U.S.C. 154(b) by 357 days.

(21) Appl. No.: 13/809,682

(22) PCT Filed: Jul. 11, 2011

(86) PCT No.: PCT/EP2011/061715
§ 371 (c)(1),
(2), (4) Date: Feb. 28, 2013

(87) PCT Pub. No.: WO2012/007408
PCT Pub. Date: Jan. 19, 2012

(65) Prior Publication Data
US 2013/0174741 A1    Jul. 11, 2013

(30) Foreign Application Priority Data

Jul. 12, 2010 (FR) ...................................... 10 55651

(51) Int. Cl.
*B01D 46/00* (2006.01)
*B01D 46/52* (2006.01)

(52) U.S. Cl.
CPC ........ *B01D 46/0028* (2013.01); *B01D 46/0023* (2013.01); *B01D 46/523* (2013.01); *B01D 2275/10* (2013.01)

(58) Field of Classification Search
CPC combination set(s) only.
See application file for complete search history.

(56) References Cited

U.S. PATENT DOCUMENTS

| 4,323,374 A | 4/1982 | Shinagawa |
| 5,158,586 A * | 10/1992 | Layton ............................ 55/497 |
| 5,238,477 A * | 8/1993 | Layton ............................ 55/497 |
| 5,306,321 A * | 4/1994 | Osendorf ......................... 55/487 |
| 5,874,052 A * | 2/1999 | Holland ......................... 422/171 |
| 6,224,655 B1 * | 5/2001 | Messier ......................... 96/226 |
| 2008/0308488 A1 * | 12/2008 | Iwakata et al. ................. 210/455 |
| 2012/0186452 A1 * | 7/2012 | Smithies et al. .................... 96/9 |

FOREIGN PATENT DOCUMENTS

| EP | 1952869 A1 | 8/2008 |
| WO | 0025833 A1 | 5/2000 |

* cited by examiner

*Primary Examiner* — Duane Smith
*Assistant Examiner* — Sonji Turner
(74) *Attorney, Agent, or Firm* — Bachman & LaPointe, P.C.

(57) ABSTRACT

A microbicidal filter for treating air, includes, in the allocated direction of flow of the air stream capable of passing therethrough, a filtration layer and a HEPA filter. The filtration layer contains a bactericidal and/or fungicidal agent, and the HEPA filter is pleated while being applied against a second pleated filtration layer that is arranged downstream, so as to prevent the mutual contacting of its pleats. The combination of the action of the impregnated layer and of the HEPA filter inhibits or kills by contact all the living particles that penetrate into the microbicidal filter. The HEPA filter is held in stable application in the pleated shape thereof against the second filtration layer, so that filtering performance deteriorates only gradually.

8 Claims, 3 Drawing Sheets

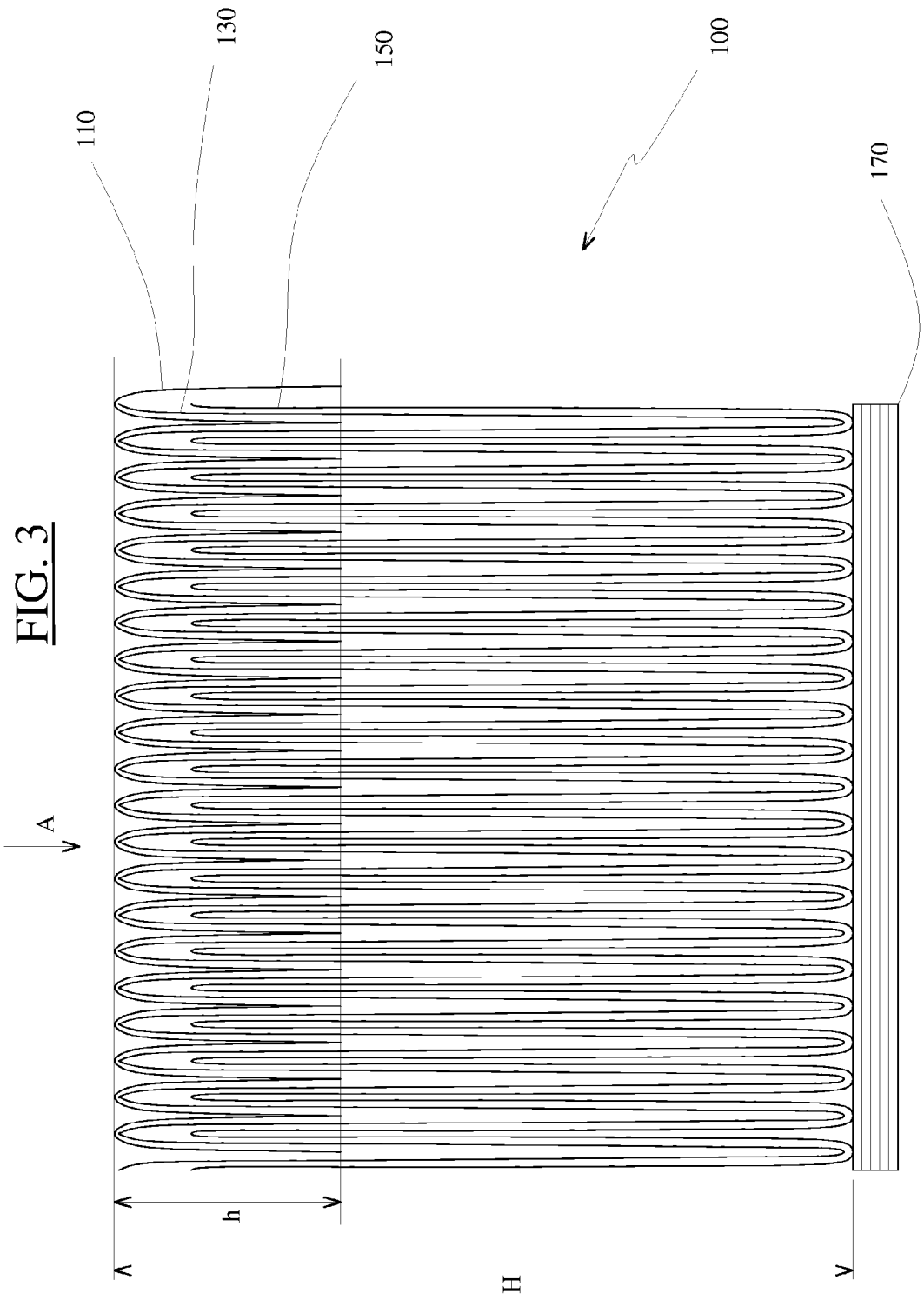

MICROBICIDAL FILTER AND FILTRATION CARTRIDGE INCORPORATING SUCH A FILTER

BACKGROUND

The present invention relates to a microbicidal filter for treating air and a filtration cartridge comprising such a filter.

A filter for clean rooms and hospitals is known from a reading of the document U.S. Pat. No. B-4,323,374. It is composed, in a preferential configuration, of a HEPA filter conformed in a zigzag, downstream of which a filtration layer is placed, fabricated from polypropylene fibres with an electrostatic property. The upstream HEPA layer retains the particles and microbes with a size of less than 0.3 micrometers. The downstream layer retains a large quantity of particles with a size of less than 0.111 micrometers. Separators are placed between the pleats of a pleated element to separate its walls. The advantages proposed are high efficiency and low fouling.

The living particles trapped by the HEPA filter do however remain living and may contaminate the air, in particular during the filter replacement operation, so that the person carrying out this work is exposed to a health risk. Moreover, separators must be placed in the hollows of the pleats to prevent collapse of the pleated element.

SUMMARY OF THE INVENTION

The aim of the invention is therefore to propose a microbicidal filter and a cartridge incorporating such a filter that is inoffensive during replacement thereof and treatment thereof in the course of time as waste, and which is of a construction stable over time and at less cost.

To this end, a microbicidal filter is proposed for air treatment, of the type comprising, in the allocated direction of flow of the air stream liable to pass through it, a filtration layer and a HEPA filter; according to the invention the filtration layer contains a bactericidal and/or fungicidal agent, and the HEPA filter is pleated while being applied against a second pleated filtration layer placed downstream, so as to prevent the mutual contacting of its pleats.

The combination of the action of the impregnated layer and the HEPA filter inhibits or kills by contact all the living particles that enter the microbicidal filter.

The HEPA filter is kept applied in a stable fashion in its pleated geometry against the second filtration layer so that the filtration performances change only gradually.

According to an additional feature of the invention, the first filtration layer is pleated, the HEPA filter being held in its pleated geometry between the two filtration layers.

The efficacy of the action of the impregnated layer is increased because it is juxtaposed against a HEPA filter, the bactericidal and/or fungicidal agent being able also to diffuse as far as the HEPA filter in the gap that separates them in order to inhibit or kill the living particles retained on the HEPA filter. Moreover, the HEPA filter is interposed, at least locally, between the two filtration layers so that it does not deform in use and procures for the filter a change in its performances over time that is predictable.

According to an additional feature of the invention the height (h) of the first filtration layer is between 20% and 50% of the height (H) of the microbicidal filter.

The service life of the microbicidal filter is increased by preventing the collapse of the HEPA filter. Moreover, the change in the fouling of the filter remains relatively low.

According to an additional feature of the invention, the microbicidal filter comprises a support layer placed downstream, the support layer benefiting from an anti-VOC (Volatile Organic Compound) treatment.

The filter also captures almost all volatile chemical molecules.

According to an additional feature of the invention, the first layer and the second layer incorporate polypropylene fibres on which ion/silver particles have been injected.

The polypropylene fibres are arranged in the form of a three-dimensional medium and in this way have remarkable filtering capacity. The ion/silver particles have a destructive effect on the living particles.

The invention also covers a filtration cartridge incorporating such a microbicidal filter.

According to an additional feature of the invention, the filtration cartridge is of the cylindrical type.

According to an additional feature of the invention, the filtration cartridge is of the prismatic type.

BRIEF DESCRIPTION OF THE DRAWINGS

The features of the invention mentioned above, as well as others, will emerge more clearly from a reading of the following description of an example embodiment, said description being given in relation to the accompanying drawings, among which:

FIG. 3 shows a view in section of a microbicidal filter for a filtration cartridge of the prismatic type according to the invention.

DETAILED DESCRIPTION OF THE PREFERRED EMBODIMENT(S)

Figure 1:
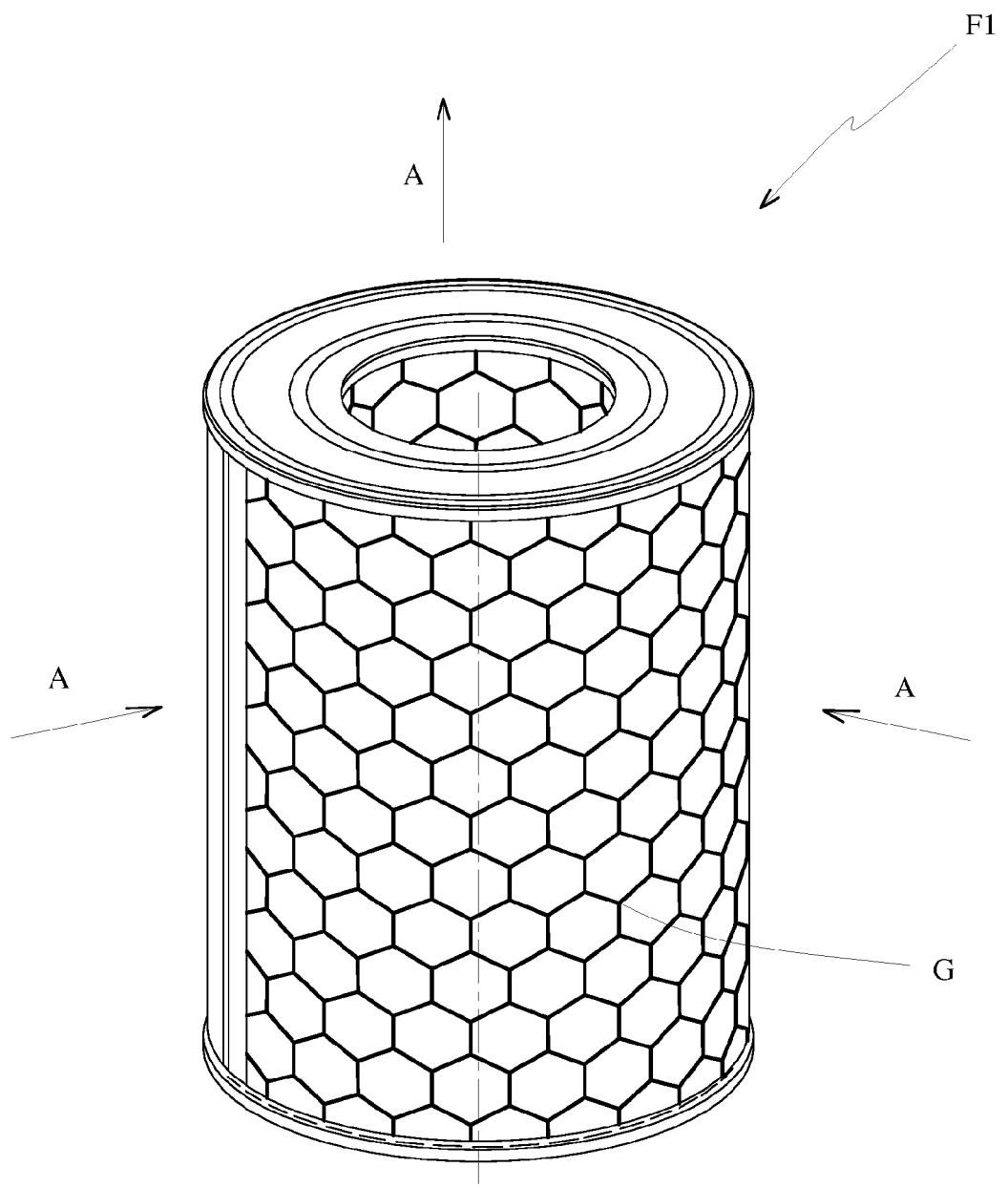
FIG. 1 shows a perspective view of a filtration cartridge of the cylindrical type according to the invention.
Figure 2:
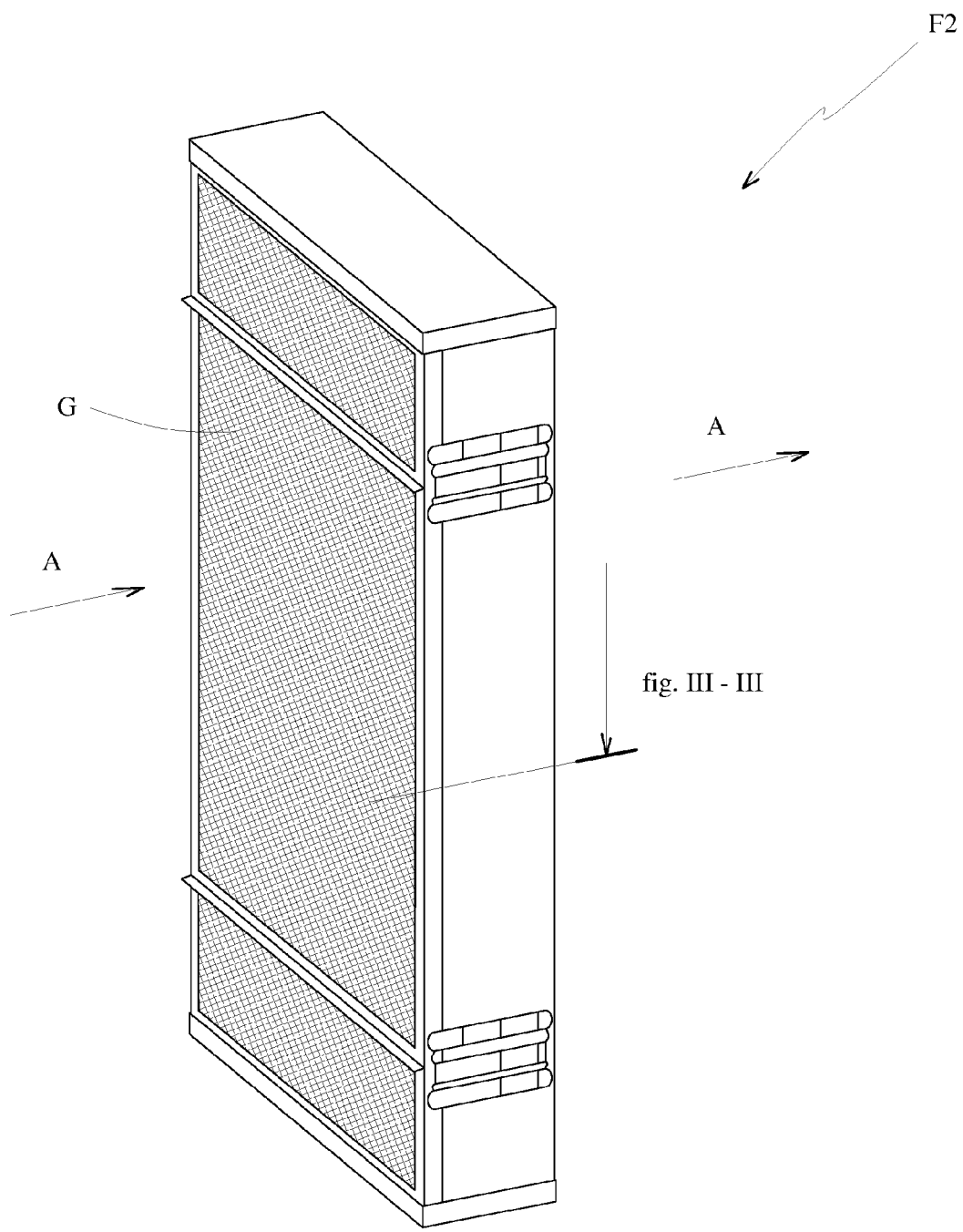
FIG. 2 shows a perspective view of a filtration cartridge of the prismatic type according to the invention.

The filtration cartridge F presented in FIGS. 1 and 2 is intended to be placed in an air treatment circuit for purifying if from the dust in suspension that it contains but also retaining pathogenic particles of smaller sizes, such as bacteria, germs, microbes and viruses. It is also effective for retaining and annihilating volatile chemical molecules.

Its application covers the field of filtration in aircraft cabins, in vehicles and in medical rooms, the field of controlled mechanical ventilation in dwellings, and in general terms all sectors of activity requiring air free from microbial or chemical pollution.

It comprises, in FIG. 1 and under the reference F1, a cylindrical frame and, in FIG. 2 and under the reference F2, a parallel epipedal frame, so that it can be connected in accordance with current standard principles.

In the first connection configuration, the air flow, represented by the arrow A, passes through it at the periphery in order to emerge through one side of the cartridge. In the second configuration, the air flow A passes through it in the direction of its thickness.

The cartridge F incorporates a microbicidal filter with a special structure, which is presented in FIG. 3. Its construction makes it more effective since no dangerous particle is released downstream. No living particles, such as bacteria, germs, microbes and other viruses, remain on its filtration elements, even when they are covered with dust and/or are clogged. Replacement of the cartridge is safer than that of known cartridges of the prior art since it does not expose the maintenance personnel to a risk of contagion through bacteria or other viruses that it contains liable to cause for example skin ailments. Treatment of the used cartridge is also easier to implement.

The microbicidal filter 100 is composed, from upstream to downstream in its filtration direction, represented by the arrow A, of a first filtration cartridge 110, a HEPA filter 130 (the acronym for High Efficiency Particulate Air), a second filtration layer 150, and a support layer 170 also treated in order to retain and annihilate chemical molecules in the gaseous state.

The three elements 110, 130 and 150 situated furthest upstream are pleated so that the HEPA filter 130 is interposed between two layers 110 and 150 that in this way form separators in order to hold the HEPA intermediate filter, which is typically more flexible, perfectly in place during the service life of the cartridge.

The first filtration layer 110 consists of a filtration element woven in three dimensions, manufactured from polypropylene. It is intended to retain the coarser particles with a size greater than 1 µm. Particles of the ion/silver type have been injected into the fibres, which then have a disinfecting action on the pathogenic living particles retained or liable to pass through this first layer. The adsorbed bacteria are destroyed or inhibited by the combined action of the silver and oxygen atoms adsorbed on the metal. The silver serves firstly to prevent development of the microorganisms and secondly to catalyse the destructive oxidation thereof. It also incorporates a bactericidal and/or fungicidal agent such as Triclosan® able to kill, in a near environment, pathogenic particles.

The HEPA filter 130 is fabricated in a weft made from paper and which incorporates glass fibres. The weft can also be made from woven fibres manufactured from polypropylene.

Its filtration characteristics are defined in particular by the standard EN 1822. It is designed to retain particles with a size greater than 0.1 µm with an efficiency greater than 99%.

The first filtration layer 110 and the HEPA filter 130 form a system capable of killing almost all pathogenic particles since those pathogenic particles that manage to pass living over the first filtration layer 110 are retained by the HEPA filter and are annihilated in a period of time lying between a few minutes and a few hours under the effect of the diffusion of the bactericidal and fungicidal agent in the closed space existing between these two layers.

It will be noted that the first filtration layer 110 is, in a variant manufacture not shown, not pleated. The fouling of this first layer certainly occurs more rapidly but it does however remain effective for killing the living particles that are intercepted therein.

The second filtration layer 150, apart from the fact that it holds the HEPA filter perfectly in its pleated configuration, preventing its pleats sagging on themselves, affords two advantageous functionalities.

The structure of this second filtration layer 150 is identical to that of the first layer.

It destroys the pathogenic particles of very small size that would have been able to pass living over the barrier of the HEPA filter, by virtue of the presence of particles of the ion/silver type and the bactericidal and fungicidal agent that it contains. The pathogenic particles liable to be contained in this second filtration layer 150 are therefore doomed to die. The pathogenic particles retained in the first filter layer 110 are also killed and are therefore inoffensive. Thus the microbicidal filter can be handled without danger, that is to say without risk of the person intervening being contaminated. Recycling thereof is also less difficult to carry out.

The support layer 170 has a non-pleated configuration in order to serve as a seat in the cartridge for the upstream filtration layers. It is also designed to retain chemical molecules in the gaseous state.

It is in the form of a flat structure in a cartridge of the parallelepipedal type and a cylindrical structure in a cartridge of the cylindrical type. It is fabricated from the same material as the layers 110 and 150, that is to say from woven filtration elements manufactured from polypropylene, incorporating a bactericidal/fungicidal agent. Its thickness is however greater. It results from a superimposition of several layers of woven filtration elements that also issue from a treatment, for example using an agent that releases anions, intended to annihilate gaseous molecules. It consists of five layers in this FIG. 3. Its thicker structure is effective for inhibiting gases by extending the duration of transit thereof. It therefore acts as an anti-odour filter, also referred to as a VOC (Volatile Organic Compound) chemical filter.

The various layers 110, 150 and 170 are, in an advantageous manufacturing mode, elements that can be sold by the company NOVEKO or by other companies.

The various layers 110, 150 and 170 are manufactured, from the start, from the same material, so that only two materials form part of the construction of the microbicidal filter 10.

The manufacture of the microbicidal filter 100 is as follows. The first filtration layer 110 is heated, for example by means of radiant heating, and is then pleated over a height h between 20% and 50% of the total height H of the pleated area of the microbicidal filter. This geometry procures an advantageous filtration efficiency with a relatively slow change in its clogging because of its separating effect. A height h of around 30% of the height H represents an advantageous compromise. The aeraulic performance obtained is substantially greater than that of known filters.

The HEPA filter 130 is heated and then pleated. The second filtration layer 150 is heated and pleated. The pleating height of the second filtration layer 150 is less than that of the HEPA filter 130.

The three filtration layers are interleaved mutually so as to form a pleated structure in which the pleats of the HEPA filter 130 remain interposed, on the upstream side, between the pleats of the first filtration layer 110 and on the downstream side between the pleats of the second filtration layer 150

The presence of the second filtration layer 150 prevents the pleats of the HEPA filter 130 from touching each other when an air flow is admitted through it. Retraction of the HEPA filter 130 and in general terms the "collapse", the commonly used term, of the filter is prevented.

Consequently a filtration structure is obtained characterised by satisfactory aeraulic performances that diminish only slowly and predictably as the filtration cartridge becomes fouled.

This pleated structure is put up against a support layer 170 of suitable size and then the assembly is inserted in the frame of a filtration cartridge upstream of a retaining grille G, in a flat configuration for a filtration cartridge of the prismatic type and in a cylindrical configuration for a filtration cartridge of the cylindrical type.

The filtration cartridge of the invention prevents the release of living particles. Its replacement in the context of a maintenance operation eliminates any risk of contamination of the maintenance personnel. Recycling of the cartridge is less difficult to implement. The geometry of its structure remains stable over time, a guarantee of predictable performance, without using separators or dedicated spacers, typically formed by plates or beads of adhesive. It is easy and relatively inexpensive to fabricate.

The invention claimed is:

1. A microbicidal filter for air treatment comprising, in an allocated direction of flow of an airstream liable to pass through the filter, a first filtration layer and a HEPA filter, wherein the first filtration layer contains a bactericidal and/or fungicidal agent and the HEPA filter is pleated while being applied against a second pleated filtration layer placed downstream, said first filtration layer and said second filtration layer comprising a polypropylene fiber filter element woven in three dimensions.

2. The microbicidal filter according to claim 1, wherein the first filtration layer is pleated and the HEPA filter is held in a pleated geometry between the first and second filtration layers so as to prevent the mutual contact of the HEPA filter pleats.

3. The microbicidal filter according to claim 2, wherein a height of the pleats of the first filtration layer is between 20% and 50% of a height of the pleats of the microbicidal filter.

4. The microbicidal filter according to claim 1, further comprising a support layer placed downstream, and the support layer comprising an anti-VOC (Volatile Organic Compound) treatment, comprising an agent that releases anions, configured to annihilate gaseous molecules.

5. The microbicidal filter according to claim 1, wherein the first filtration layer and the second filtration layer incorporate polypropylene fibres on which ion/silver particles have been injected.

6. A filtration cartridge, incorporating a microbicidal filter according to claim 1.

7. The filtration cartridge according to claim 6, wherein the filtration cartridge is cylindrical.

8. The filtration cartridge according to claim 6, wherein the filtration cartridge is prismatic.

\* \* \* \* \*